United States Patent Office 3,230,248
Patented Jan. 18, 1966

3,230,248
PREPARATION OF METHYL OR ETHYL METHACRYLATE
Masaya Yanagita, Syracuse, N.Y., and Masao Kitahara, Chiba-shi, Chiba-ken, and Takashi Mitsui, Tokyo, Japan, assignors to Rikagaku Kenkyusho, Tokyo, Japan, a corporation of Japan
No Drawing. Filed July 13, 1962, Ser. No. 209,799
Claims priority, application Japan, July 18, 1961, 36/25,224; June 13, 1962, 37/23,907
1 Claim. (Cl. 260—486)

This invention relates to the process for preparing esters of α,β-unsaturated acids from corresponding olefinic hydrocarbons. The object of this invention is to produce such esters of α,β-unsaturated acids easily and economically.

The process is represented by the following general formulas:

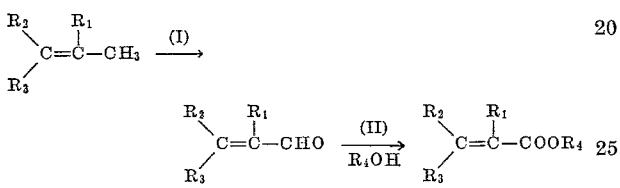

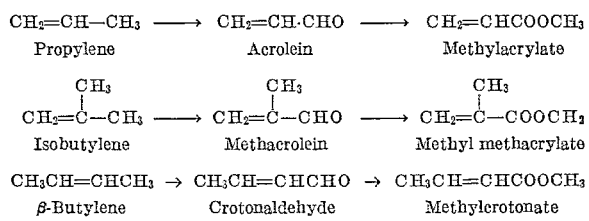

wherein $R_1$, $R_2$ and $R_3$ are the groups consisting of hydrogen or $CH_3$ or $C_2H_5$, and $R_4$ the alkyl group. Some of the specific examples of the above reactions are as follows:

$CH_2=CH-CH_3 \longrightarrow CH_2=CH\cdot CHO \longrightarrow CH_2=CHCOOCH_3$
Propylene      Acrolein      Methylacrylate $CH_2=\underset{CH_3}{\overset{|}{C}}-CH_3 \longrightarrow CH_2=\underset{CH_3}{\overset{|}{C}}-CHO \longrightarrow CH_2=\underset{CH_3}{\overset{|}{C}}-COOCH_3$
Isobutylene      Methacrolein      Methyl methacrylate $CH_3CH=CHCH_3 \rightarrow CH_3CH=CHCHO \rightarrow CH_3CH=CHCOOCH_3$
β-Butylene      Crotonaldehyde      Methylcrotonate Olefins which may be used in the process of the present invention include propylene, isobutylene, and β-butylene.

In detail, the present invention involves: (1) the first step in which the olefinic hydrocarbon is converted to α,β-unsaturated aldehyde by vapor phase oxidation in the presence of a catalyst, (2) the step of recovering the resulting α,β-unsaturated aldehyde, (3) the step of oxidizing the α,β-unsaturated aldehyde into esters of α,β-unsaturated acid and (4) finally the method of esterifying the by-product α,β-unsaturated acids produced in the third step. The object of this invention is to provide a novel industrial process for producing acrylate, methacrylate and other esters easily and economically.

The present invention is specifically described in the following in the order of the steps stated above.

In the catalytic vapor phase oxidation of olefins such as propylene, isobutylene and others into acrolein, methacrolein and other corresponding α,β-unsaturated aldehydes, the catalysts so far used are cuprous oxide, cupric oxide, selenium compounds of silver or of copper (U.S. Pats. Nos. 2,688,603, 2,486,842 and 2,383,711, and British Pats. Nos. 704,388 695,028 and 694,362) and the like. However, these compounds are generally unsatisfactory as catalysts because of their short life and poor durability for regenerating use. Thus, for practical use, reliable catalysts have long been desired.

According to the present invention, the above oxidation reaction is conducted by using molybdenum oxide, vanadium oxide, phosphoric anhydride adsorbed on a spongy carrier or the like as a catalyst. The results of using these catalysts are listed below.

The following table show the yields of methacrolein obtained when isobutylene is oxidized using aluminum sponge as carrier and molybdenum oxide, vanadium oxide and phosphoric anhydride in various ratios as catalysts.

TABLE 1. — RATIO OF THE AMOUNTS OF CATALYSTS USED AND RESULTANT PRODUCTS

[Condition of the reaction: Concentration of isobutylene, 0.7%; space velocity, 4800 h.⁻¹; and contact time, 0.3 sec.]

| Ratio of the amount of catalysts (by weight) | Reaction products (mole percent) | | | |
|---|---|---|---|---|
| $MoO_3:V_2O_5:P_2O_5$ | Methacrolein | All acidic product | OxO-type comp. except methacrolein | $CO_2$ |
| 100:300:0 | 19.9 | 8.4 | 6.2 | 17.6 |
| 100:300:20 | 22.7 | 8.6 | 7.0 | 13.6 |
| 100:300:40 | 19.0 | 19.8 | 6.8 | 29.2 |
| 100:100:10 | 41.8 | 13.7 | 6.0 | ---- |
| 100:100:40 | 41.2 | 14.7 | 9.5 | ---- |
| 100: 50:15 | 44.8 | 13.3 | 11.2 | 5.0 |
| 100:33 :13 | 45.4 | 9.0 | 6.8 | 10.0 |
| 100:25 :13 | 46.5 | 9.4 | 5.9 | 12.2 |
| 100:20 :0 | 20.5 | 16.7 | 6.7 | ---- |
| 100:20 :12 | 48.2 | 10.4 | 8.8 | 3.0 |
| 100:10 :11 | 45.0 | 9.8 | 7.5 | ---- |
| 100: 3 :10 | 43.5 | 10.8 | 10.3 | ---- |
| 100: 0 :10 | 41.0 | 11.5 | 12.1 | ---- |

The reaction products were analyzed quantitatively as follows. For aldehyde content by means of gravimetric method; using 2,4-dinitrophenylhydrazine solution saturated in 2 N hydrochloric acid; for acidic substances, by titration using aqueous 0.1 N potassium hydroxide solution; for carbon dioxide and carbon monooxide contents, by means of gas analysis (Hempel's method); and for unreacted isobutylene, by gas-chromatography.

It was found that when the amount of applied $V_2O_5$ is excessive, isobutylene is over-oxidized, tending to decompose. Therefore, $MoO_3$ should be the main component and $V_2O_5$ should not exceed $MoO_3$ in quantity furthermore, the addition of $P_2O_5$ to the two foresaid substances greatly enhances the catalytic effect. Furthermore, when the $P_2O_5$ exceeds 50%, there results caking which makes the catalyst hard to handle. A catalyst composed of $MoO_3$ and $P_2O_5$ ($V_2O_5$ not included) is also applicable.

Based upon the results of the above experiments, the present invention designates the following ratio as suitable, that is:

$$MoO_3:V_2O_5:P_2O_5 = 100:0-100:1-100$$

The following substances may be used as raw materials for the preparation. Ammonium molybdate or other water-soluble molybdates for molybdenum oxide; ammonium metavanadate or other water-soluble vanadates for vanadium oxide; phosphoric acid or ammonium phosphate for phosphoric anhydride. Ammonium phosphomolybdate, ammonium phosphovanadate or other water-soluble salts also may be employed as a part of the raw materials.

As carriers of the catalyst of this invention are aluminum sponge, coal cinders and other substances commonly utilized for oxidation in gaseous state such as pumice stones, alumina, silicon carbide, silica gel and fire stone.

The optimum adsorption rate of the catalyst onto the carriers is 10 to 40% by weight, and these oxides may be employed in any suitable formation.

Air is usually used as the oxidizing agent for catalytic oxidation of this invention, and other applicable agents are air or nitrogen enriched with oxygen, and air or oxygen mixed with inactive gases such as carbon dioxide or water vapor.

The catalyst used in the process of this invention is prepared as follows: To the warm aqueous solution of molybdate and vanadate is added aqueous phosphoric acid, made alkaline by ammonia; the resulting solution is then added to the carriers in the form of fine granules, selected from those listed above and evaporated to dryness with stirring. The thus produced catalyst is then charged in a reaction tower, heat-treated as the mixed gas of air and isobutylene is passed and, after completion of the treatment, is sieved. The optimum temperature of treating is 300° C. to 450° C. and the time duration is preferably from 30 to 50 hours.

Oxidation of isobutylene is carried out as follows: the catalyst prepared as stated in the above paragraph is charged in the reaction tower where the mixed gas of air and isobutylene passes through at the required temperature. The gaseous products are cooled by ice, and oxo-compounds (chiefly formaldehyde and acetaldehyde) and acidic substances (chiefly acetic acid) which are easy to condense are removed, and then dried well, and finally methacrolein is recovered by either condensation or absorption into alcohol. The process of oxidation is conducted preferably at temperature between 400° C. and 560° C. The composition of the gaseous products of this process are shown in the foregoing table.

The catalyst of this invention is particularly adapted to be adsorbed on carriers and highly resistive against mechanical friction because of the inclusion of $P_2O_5$. Moreover, the catalyst maintains constant activity during the reaction and has persistence of activity as well. The simplicity and economy of production may also be considered as meritorious.

To the catalyst composed of two or three components specified in the foregoing description may be added, if desirable, other effective ingredients such as $As_2O_3$, $B_2O_3$, $TiO_2$, $WO_3$, $CuO$, $Cu_2O$, $AgO$, $Ag_2O$, $NiO$, etc. The catalysts composed of some of those materials listed above are also applicable for producing acrolein by oxidation of propylene, and crotonaldehyde by oxidation of $\beta$-butylene, for example.

It is discovered that $\alpha,\beta$-unsaturated aldehydes prepared from olefins by oxidation with oxygen or air, as shown in Table 2, are more soluble in lower alcohols than in other various organic solvents.

oxidizing agent and its amount of application may be the theoretical one. Its concentration is preferably high, 80% at least, however, excessive amounts should be avoided. The reaction is preferably carried out at low temperatures of 0° C. or below. An inhibitor of polymerization such as hydroquinone and others may be added as stabilizers.

The resulting esters of $\alpha,\beta$-unsaturated acids are isolated by such conventional procedure as fractional distillation, extraction or the like.

According to the present invention, the raw material may also be $\alpha,\beta$-unsaturated aldehydes absorbed into alcohols to form solutions which are obtained by oxidation of olefins with air or oxygen. The said solutions contain, besides $\alpha,\beta$-unsaturated aldehydes, by-products comprising acidic substances and oxo-compounds, the boiling points of which are close to those of $\alpha,\beta$-unsaturated aldehydes, causing difficulty in the product's purification and isolation. However, the application of the $H_2O_2$-$SeO_2$ oxidation method of this invention resolves the said difficulties by converting these by-products into substances having boiling points apart from those of the reaction products of the $\alpha,\beta$-unsaturated aldehydes.

As an example, hereafter will be described the condensation-absorption of the desired product. In this example, methacrolein was synthesized from isobutylene by oxidation adopting methanol as absorbing solvent.

From a reaction tower, the gaseous products are led to Part A (composed of four round-bottomed flasks) where they are cooled on ice and more than 90% (percentage to the whole amount of each substance produced, same hereafter) of acidic substances, 75% of other oxo-compounds other than methacrolein and 2 to 3% of methacrolein condense. Then the residual gases pass a cooling Part B (composed of two round-bottomed flasks) where the temperature is —20° C., and where water is nearly completely removed.

Additionual parts of methacrolein are condensed, gathered and later combined with the principal part which is collected at Part C (composed of two round-bottomed flasks, cooled at —75° C. by the combination of Dry Ice TABLE 2.—AMOUNT OF METHACROLEIN ABSORBED INTO 25 g. OF EACH SOLVENT

| Solvent | Absorption temperature (° C.) | Absorption time (min.) | In- or decrease of solvents after absorption (g.) | Methacrolein recovered (Percent) | M.P. of 2,4-dinitrophenylhydrazone (° C.) |
|---|---|---|---|---|---|
| Xylol | —15 | 10 | +0.3 | 31.9 | 166–180 |
| Trichloroethylene | —60 | 10 | +0.2 | 37.7 | 194–195 |
| Butyl acetate | —60 | 10 | +0.5 | 30.9 | 188–190 |
| Toluene | —65 | 10 | +0.3 | 25.3 | 185–188 |
| Methyl alcohol | —70 | 10 | +0.1 | 39.6 | 189–190 |
| Ethyl alcohol | —70 | 10 | +0.4 | 38.1 | 189–190 |
| n-Butyl alcohol | —70 | 10 | +0.4 | 36.2 | 189–190 |
| Ether | —70 | 10 | —0.5 | 27.4 | 189–191 |
| Ethyl acetate | —70 | 10 | +0.4 | 36.4 | 189–191 |
| Standard yield of methacrolein | | | | (40.3%) | (189–190) |

It was further discovered that lower alcoholic esters of $\alpha,\beta$-unsaturated acids are directly formed when the lower alcoholic solutions of unsaturated aldehydes are oxidized at or below 0° C. with hydrogen peroxide ($H_2O_2$) as an oxidizing agent and with selenium dioxide ($SeO_2$) as a catalyst. The formation of esters as said above is dependent upon the concentration of $\alpha,\beta$-unsaturated aldehyde in the alcoholic solution, the amount of the oxidizing catalyst, and the concentration and the amount of the oxidizing agent. The embodiment of the present invention is more specifically described as follows.

$\alpha,\beta$-unsaturated aldehydes suitable as raw materials of this invention are acrolein, methacrolein, crotonaldehyde and the like. Methanol and ethanol are suitable as solvents. The oxidizing catalyst is selenium dioxide and its amount may be 3 to 5%. Hydrogen peroxide is the and methanol), where 78% of methacrolein is condensed and recovered. The gas that has passed Part C contains a considerable amount of methacrolein, 20% of which is absorbed and gathered into methanol contained in glass vessels at Part D (consisting of two said glass vessels containing 70 g. of methanol in each, at —75° C.). After passing D and E, the residual gas is released into the atmosphere, the exhaust being quantitatively analyzed for its methacrolein content at Part F (consisting of three wide-mouthed bottles, each capacity being 500 ml., each containing 250 ml. of 2,4-dinitrophenylhydrazine saturated in 2 N hydrochloric acid). According to the results of the analysis, the exhaust contains less than 1% of methacrolein, together with other such products as unreacted isobutylene, carbon dioxide, carbon monoxide, etc. Evidently in the experiment, 98% of the produced methacrolein are condensed and recovered as Parts B, C and D.

More particularly, in the example described above, there are used 50 g. of the catalyst, its composition being $V_3O_5$, $MoO_3$ and $P_2O_5$ in the ratio 1:4.5:0.55, and, as reactants, 2 liters per minute of air and 16.63 g. per hour of isobutylene. The isobutylene concentration in the gas mixture is 4.8%. The conditions are: space velocity 2520 h.$^{-1}$, contact time 0.47 sec., reaction temperature 530 to 550° C., reaction time 24 hours, and the apparatus for condensation is the one described in the foregoing paragraph. After condensation and absorption the following products are obtained in the liquid state. The initial amount of isobutylene used is 399.2 g. (All percentages are in moles.)

| | Percent |
|---|---|
| Acidic substances (assumed to be acetic acid and titrated by N/10 caustic potash) | 4.65 |
| Oxo-compounds in acidic fraction (assumed to be acetaldehyde and quantified by means of 2,4-dinitrophenyl hydrazine) | 6.93 |
| Methacrolein: | |
| Quantified as methacrolein by means of 2,4-dinitrophenyl hydrazine | 33.04 |
| By means of gas-chromatography | 31.92 |

The weights of the reaction products were 305 g. at A, 18.5 g. at the lower part of B, a total of 142 g. at the upper part of B and C and 40 g. at D (weight increment of methanol).

Of the total of 322 g. obtained at the upper parts of B, C and D, 140 g. were methanol solvent, and the other portion contained 160.2 g. of methacrolein, 14.6 g. of a mixture of acetaldehyde, acrolein, acetone, isobutylaldehyde, methylvinylketone and other products, 5.5 g. of unreacted isobutylene and 1.8 g. of water. It is difficult to isolate pure methacrolein from its methanolic solution (taken as a mixture from the upper parts of B, C and D) in a high yield. For methanol, methacrolein and sub-products of oxo-compounds have boiling points close to each other, and moreover, certain combinations of methacrolein and water, methacrolein and methanol, acrolein and water, and acrolein and methanol are azeotropic.

According to the present invention, the methanol solution of methacrolein and other sub-products are subjected to an oxidation treatment and the methacrolein portion is converted to methyl methacrylate, as shown in Table 3.

TABLE 3.—B.Ps BEFORE AND AFTER THE OXIDATION OF REACTION PRODUCTS

| Ingredients contained in raw materials (B.P., ° C.) | | Oxidation products | | | |
|---|---|---|---|---|---|
| | | Esters (B.P., ° C.) | | Acids (B.P., ° C.) | |
| Methacrolein | 68.4 | Methylmethacrylate | 100.3 | Methacrylic acid | 160.5 |
| Acrolein | 52.5 | Methyl acrylate | 80 | Acrylic acid | 141 |
| Acetone | 56.5 | Unoxidizable | | | |
| Isobutyl aldehyde | 64 | Methyl isobutylate | 93 | Isobutylic acid | 154 |
| Water | | Unoxidizable | | | |
| Methanol | 64.1 | do | | | |
| Acetaldehyde | 20.2 | Methyl acetate | 59 | Acetic acid | 118 |
| Methacrolein-water | 62 | | | | |
| Methacrolein-methanol | 58 | | | | |

As shown in the above table, the boiling points of methanol and the sub-products are far different from that of methacrolein after oxidation treatment by this invention, which facilitates the isolation of methyl methacrylate.

Furthermore, a new effective method is discovered according to this invention for the esterification of α,β-unsaturated acids which has been reported to be quite difficult to conduct, for example, in Ind. Eng. Chem. 42, 768–776 (1956) where the esterification is said to be carried out efficiently only when 1/3 moles of $P_2O_5$ are added to one mole of the raw material of an α,β-unsaturated acid.

Namely, esters of α,β-unsaturated acids are obtained in relatively high yield when α,β-unsaturated acids are dissolved in alcohol containing concentrated sulfuric acid, and subjected to heat-treatment under slight pressure in a nitrogen atmosphere. The optimum conditions of the reaction are set up as follows: the amount of the catalyst is 1 to 10% that of the amount of the α,β-unsaturated acid, the amount of alcohol is two to five times as much as the said acid in molar ratio, the reaction temperature is between the range of 50° C. and 150° C., and the reaction time 10 to 180 minutes.

The process described above may be carried out at or under atmospheric pressure, without producing much polymers, if procedures and conditions are carefully handled and set up.

This esterification process may also be applied to that of the α,β-unsaturated acids which are sub-produced when α,β-unsaturated aldehydes, obtained by oxidation of olefins, are again oxidized using $H_2O_2$-$SeO_2$ system oxidation to produce esters of α,β-unsaturated acids: for instance, isobutylene is converted to methacrolein, which then undergoes $H_2O_2$-$SeO_2$ oxidation and becomes a methacrylate, in course of which is sub-produced methacrylic acid, which is easily esterified with high yield into an ester of methacrylic acid according to the method of this invention.

By summarizing what has been so far stated above, it is evident that the present invention provides a new process of industrially producing esters of α,β-unsaturated acids from olefins by two oxidation steps with the product being produced in high yield and at low cost.

*Example 1*

The catalyst employed in this invention was prepared by the following process: 2.0 g. of ammonium meta vanadate and 9.36 g. of ammonium molybdate were dissolved in about 200 ml. of hot water. 1.5 g. of phosphoric acid were diluted with 10 ml. of water and alkalized by 28% aqueous ammonia, the latter alkaline solution was added into the former, and then the resulting solution mixture was added onto a carrier of 50 g. of 6 to 10 mesh aluminum sponge in an evaporating dish and evaporated to dryness with stirring. Thus the mixture was adsorbed on the aluminum sponge. After drying completely, the thus prepared catalyst was charged in the reaction tower and treated by passing the gas mixture of 4 l./min. of air and 10 ml./min. of isobutylene through the tower at 400 to 500° C. for 20 hours. Then the catalyst was taken out of the tower and sieved through a 10 mesh sieve, yielding 59.2 g. of catalyst which was composed of 10 g. of metal oxides in the gravimetric ratio of

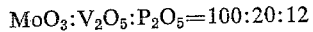

$MoO_3$:$V_2O_5$:$P_2O_5$=100:20:12

In a reaction tower charged with 50 g. of the catalyst produced according to the above process a gas mixture of 4 liters of air and 25 ml. of isobutylene was passed per minute through the catalyst layer at 430±5° C. The gaseous reaction product was then cooled on ice to remove oxo-compounds and acidic substances (mainly acetic acid) which condense at lower temperatures than methacrolein. The reaction product was cooled to −20° C. to eliminate as much water as possible, passed through a drying tower charged with calcium chloride or silica gel, to completely eliminate the moisture and cooled still further to −75° C. where methacrolein was condensed, absorbed in alcohol and recovered. The reaction time was 15.5 hours. 35 g. of methacrolein was produced from 58.2 g. of isobutylene, representing a yield in molar ratio of 48.2%.

Example 2

According to the process of Example 1, 59.5 g. of the catalyst were prepared from 50 g. of 6 to 10 mesh aluminum sponge, 4.0 g. of ammonium meta vanadate, 7.5 g. of ammonium molybdate, 1.5 g. of phosphoric acid and 7.5 ml. of 28% aqueous ammonia. The resulting catalyst contained 10 g. of metal oxides which were composed of $MoO_3$, $V_2O_5$ and $P_2O_5$ in the ratio of 100:50:15 by weight, respectively.

50 g. of the above catalyst was charged in a reaction tower and a mixture of 4 l./min. of air and 25 ml./min. of isobutylene was passed through the catalyst layer at 425±5° C. After 5 hours and 40 minutes of reaction time, 11.9 g. of methacrolein were obtained from 21.3 g. of isobutylene, representing the molar yield of 44.8%.

Example 3

The catalyst employed in this example was the same as in Example 1, containing $MoO_3$, $V_2O_5$ and $P_2O_5$ in the gravimetric ratio of 100, 20 and 12, respectively. 50 g. of this catalyst was charged into the reaction tower and a mixed gas of 2 liters per minute of air and 11.25 g. per hour of propylene (the concentration of propylene being 4.8%) was passed through the catalyst layer at the temperature range from 470° C. to 480° C. After six hours of reaction time, 35.1 g. of acrolein was produced from 67.5 g. of propylene, resulting in the molar yield of 39.0%.

Other substances contained in the product were 7.5% of acidic substances (mainly acetic acid including a small amount of acrylic acid), 8.0% of oxo-compound excluding acrolein (mainly acetaldehyde and a small amount of condensation and/or polymerization products), 12.5% of carbon dioxide, 15.0% of carbon monooxide and 11.0% of unreacted propylene, the total amounting to 93.0%.

Example 4

According to the same process as in Example 1, 118.2 g. of the catalyst were prepared from 100 g. of 6 to 10 mesh aluminum sponge, 22.5 g. of ammonium molybdate, 3.0 g. of phosphoric acid (specific gravity 1.7) and 15.0 ml. of 28% aqueous ammonia. The catalyst contained metal oxides of $MoO_3$ and $P_2O_5$ in the ratio of 100 and 10 by weight, its adsorption rate being 20% by weight of the carrier. 50 g. of the resulting catalyst were then charged in the reaction tower and a mixed gas of 4 liter per minute of air and 30 g. per hour of isobutylene (the concentration of isobutylene in the said gas being 4.8%) was passed through the catalyst layer at a temperature range from 530° C. to 540° C.

After 6 hours of reaction time, 76.5 of methacrolein were produced from 180 g. of isobutylene, resulting in the molar yield of methacrolein of 34.0%, the rate of conversion of 75.0% and the selectivity of 45.3%.

Example 5

4 g. of acrolein was dissolved in methanol to make a 20% solution, to which was added 0.2 g. of selenium dioxide, 0.1 g. of hydroquinone and then the resulting product was subjected to cooling on ice, whereafter 2.8 g. of 87% hydrogen peroxide was added dropwise with stirring. Upon stirring 2.8 g. of 87% hydrogen peroxide, dropwise. Upon the completion of this addition, the mixture was left to stand for 48 hours cooling on ice at 0° C. to 5° C. without stirring, thus completing the reaction. Precisely fractionating the mixture under reduced pressure, the products, methyl acrylate and acrylic acid, were separated from other by-products. 4.67 g. of methyl acrylate and 1.17 g. of acrylic acid were obtained, the molar yields of both compounds being 76.0% and 22.8%, respectively. Unreacted acrolein existed only as traces.

Example 6

5 g. of methacrolein were dissolved in methanol to make 20% methanolic solution, to which were added 0.25 g. of selenium doxide, 0.1 g. of hydroquinone and then with stirring and cooling on ice 2.8 g. of 87% hydrogen peroxide, dropwise. Upon the completion of these additions, the reaction mixture was left to stand for 48 hours to complete oxidation and then treated under reduced pressure as in Example 5.

As a result, 5.36 g. of methyl methacrylate and 1.47 g. of methacrylic acid were produced in the yields of 75.0% and 23.9%, respectively.

Example 7

To 78.8 g. of 20.62% (by weight) methanolic solution of methacrolein which was prepared through the oxidation of isobutylene as precisely described in the above specification, were added 0.8 g. of selenium dioxide, 0.3 g. of hydroquinone and with cooling and stirring 9.1 g. of 87% hydrogen peroxide, dropwise. When the addition was finished, the reaction mixture was left to stand cooling on ice at 0° to 5° C. without stirring for 48 hours to complete the reaction and then distilled under reduced pressure as in Example 5.

As the result, 16.4 g. of methyl methacrylate and 5.63 g. of methacrylic acid, the yields of which being 70.7% and 28.2%, respectively.

Example 8

To 85.0 g. of 22% (by weight) ethanolic solution of acrolein which contained 18.7 g. of acrolein and was obtained through oxidation of propylene, were added 0.56 g. of selenium dioxide, 0.2 g. of hydroquinone and with stirring and cooling on ice 13.1 g. of 87% hydrogen peroxide, dropwise. After completion of these additions, the reaction mixture was left to stand cooling on ice without any more stirring for 48 hours to complete the reaction and distilled as in Example 5. 22.7 g. of ethyl acrylate and 7.9 g. of acrylic acid were produced, representing the yields of 68.0% and 33.0%, respectively.

Example 9

Into 4.5 g. of methanol (five times as much as the starting acrylic acid in molar ratio) charged in a pressure-resistant glass vessel, were dissolved 0.03 g. of concentrated sulfuric acid (1.5 percent of the amount of the said acrylic acid) and then added 2.0 g. of acrylic acid which previously contained 0.1% hydroquinone. Then the gaseous part of the vessel was replaced with nitrogen, and the vessel was closed and heated at 110° C. for 30 minutes in an oil bath. The yield of the resultant methyl acrylate was estimated by gas-chromatography to be 93%.

Example 10

The methanol solution of methacrolein produced through oxidation of isobutylene as stated in Example 7 was oxidized using $H_2O_2$—$SeO_2$, resulting in methyl methacrylate produced in good yield together with a small amount of methacrylic acid as a by-product. 2 g. of this methacrylic acid were added to 5.0 g. of methanol (five times as much as the starting methacrylic acid in molar ratio) containing 0.03 g. of concentrated sulfuric acid (1.5 percent of the amount of the methacrylic acid) and heated at 110° C. for 30 minutes in a closed vessel. The yield of the resulting methyl methacrylate was found to be 95% by gas-chromatography.

What is claimed is:

A process of preparing methyl and ethyl esters of methacrylic acid, said process comprising the steps of converting isobutylene into methacrolein by oxidizing the isobutylene at temperatures between 400–560° C. with an oxidizing agent in the gaseous state in the presence of a mixed complex catalyst, said oxidizing agent being selected from the group consisting of air, oxygen and mixtures thereof, said catalyst being adsorbed on a carrier selected from the group consisting of aluminum sponge, alumina, coal cinders, pumice stone, silicon carbide, silica gel and fire stone, said catalyst being prepared by mixing $MoO_3$, $V_2O_5$ and $P_2O_5$ in the ratio of 100:0–50:10–15 parts by weight, separating said methacrolein from a substantial portion of the gaseous reaction by-products by first cooling the reaction product on ice to separate the by-products and then further cooling the reaction product at temperatures between −20° C. and −75° C. in an alcohol selected from the group consisting of methanol and ethanol to form an alcoholic mixture, said alcoholic mixture being further oxidized by hydrogen peroxide in the presence of a second catalyst and hydroquinone at a temperature between 0 and 5° C. for 48 hours to produce a mixture of methacrylic acid, methyl or ethyl esters of methacrylic acid, together with any by-products, all having significantly different boiling points thereby facilitating their separation, said second catalyst being selenium dioxide, said methacrylic acid being separated from said mixture and dissolved in an alcohol selected from the group consisting of methanol and ethanol and being esterified by heating to a temperature between 50 and 150° C. for 10 to 180 minutes in the presence of concentrated sulfuric acid in an amount of about 1.5% based on the weight of methacrylic acid, the amount of alcohol being present in a ratio between two and five moles to one mole of methacrylic acid, to form methyl or ethyl esters of methacrylic acid.

References Cited by the Examiner

UNITED STATES PATENTS

| | | | |
|---|---|---|---|
| 2,744,929 | 5/1956 | Smith | 260—486 X |
| 2,810,763 | 10/1957 | Hadley | 260—486 X |
| 3,038,942 | 6/1962 | Kerr | 260—604 |

LORRAINE A. WEINBERGER, *Primary Examiner.*

LEON ZITVER, *Examiner.*

D. P. CLARKE, R. K. JACKSON, *Assistant Examiners.*